United States Patent
Crombez et al.

(10) Patent No.: US 10,730,393 B2
(45) Date of Patent: Aug. 4, 2020

(54) REGENERATIVE HYBRID VEHICLE BRAKING SYSTEM AND METHODS

(71) Applicant: Ford Global Technologies, LLC, Dearborn, MI (US)

(72) Inventors: Dale Scott Crombez, Livonia, MI (US); David John Messih, Troy, MI (US); Yanan Zhao, Ann Arbor, MI (US); Ming Lang Kuang, Canton, MI (US); Walter Joseph Ortmann, Saline, MI (US); Joseph Jay Torres, Dearborn, MI (US); Stanley L. Bower, Jr., Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

(21) Appl. No.: 15/783,369

(22) Filed: Oct. 13, 2017

(65) Prior Publication Data
US 2019/0111790 A1 Apr. 18, 2019

(51) Int. Cl.
| B60L 7/26 | (2006.01) |
| B60T 8/26 | (2006.01) |
| F16D 61/00 | (2006.01) |
| B60T 1/10 | (2006.01) |
| B60L 7/18 | (2006.01) |
| B60T 7/04 | (2006.01) |
| B60T 8/176 | (2006.01) |

(52) U.S. Cl.
CPC .................. *B60L 7/26* (2013.01); *B60L 7/18* (2013.01); *B60T 1/10* (2013.01); *B60T 7/042* (2013.01); *B60T 8/176* (2013.01); *B60T 8/267* (2013.01); *B60T 8/268* (2013.01); *F16D 61/00* (2013.01); *B60L 2240/42* (2013.01); *B60T 2220/04* (2013.01); *B60T 2270/602* (2013.01); *B60T 2270/604* (2013.01); *Y10S 903/947* (2013.01)

(58) Field of Classification Search
CPC ...................................... B60L 7/26; B60T 8/26
See application file for complete search history.

(56) References Cited

U.S. PATENT DOCUMENTS

| 7,925,411 | B2 | 4/2011 | Fuhrer et al. | |
| 8,303,049 | B2 | 11/2012 | Busack et al. | |
| 2007/0107958 | A1* | 5/2007 | Oliver | B60K 6/12 180/65.27 |
| 2008/0116743 | A1* | 5/2008 | Jeon | B60L 3/10 303/152 |
| 2013/0085650 | A1* | 4/2013 | Nakamura | B60T 1/10 701/71 |

OTHER PUBLICATIONS

Zhao, Yanan et al., "Methods and System for Regenerative Hybrid Vehicle Braking," U.S. Appl. No. 15/624,382, filed Jun. 15, 2017, 57 pages.

* cited by examiner

*Primary Examiner* — Kira Nguyen
(74) *Attorney, Agent, or Firm* — David Kelley; McCoy Russell LLP

(57) ABSTRACT

Methods and systems are provided for operating a hybrid vehicle during operating conditions where vehicle braking is requested. In one example, regenerative braking is allocated to vehicle axles responsive to wheel torques of respective vehicle axles in response to an anti-lock braking system being activated. Additionally, friction braking torque is allocated to vehicle axles responsive to the anti-lock braking system being activated.

20 Claims, 7 Drawing Sheets

REGENERATIVE HYBRID VEHICLE BRAKING SYSTEM AND METHODS

FIELD

The present description relates generally to methods and systems for controlling regenerative braking of a hybrid vehicle. The methods and systems may be particularly useful for four wheel drive hybrid vehicles.

BACKGROUND/SUMMARY

Kinetic energy of a hybrid vehicle may be converted into electrical energy via an electric machine in the hybrid vehicle's driveline. In particular, vehicle wheel torque may be converted into electrical energy via the electric machine, which may be referred to as regenerative braking. The electrical energy may be stored in an electrical energy storage device until it is subsequently used to propel the vehicle. The electric machine may have a larger inertia if the electric machine provides a substantial amount of torque to propel the vehicle. The larger inertia may be related to the number windings in the electric machine and the mass of the electric machine's armature. An electric machine having a larger inertia may be utilized to provide a desired rate of vehicle acceleration. However, the electric machine's larger inertia and/or magnetic field strength may make it more difficult to mitigate the possibility of wheel locking during wheel braking if the electric machine is providing regenerative braking. It may be desirable to provide regenerative braking while at the same time providing anti-lock wheel control during vehicle braking so that the vehicle may decelerate at a desired rate and so that at least a portion the vehicle's kinetic energy may be captured.

The inventors herein have recognized the above-mentioned issues and have developed a vehicle operating method, comprising: adjusting a regeneration torque of a primary axle to a lower magnitude value of a low pass filtered primary axle regulation torque of a right wheel and a low pass filtered primary axle regulation torque of a left wheel in response to activation of an anti-lock braking system.

By adjusting a regulation torque of a primary axle in response to a lower magnitude value of a low pass filtered primary axle regulation torque of a right wheel and a low pass filtered primary axle regulation torque of a left wheel in response to activation of an anti-lock braking system, it may be possible to provide regenerative vehicle braking while also regulating vehicle wheel speed even if an electric machine of a driveline has a larger inertia. In one example, regulation torque of a wheel may be decomposed into a regenerative braking torque and a friction braking torque. The regenerative braking torque of a wheel may include lower brake regulation torque frequencies and the friction braking torque of the wheel may include higher regulation torque frequencies so that electric machine torque does not have to respond to the higher wheel regulation torque frequencies. On the other hand, the friction brakes may respond to higher wheel regulation torque frequencies so that the possibility of wheel lock may be reduced while regenerative braking is in progress. Additionally, regenerative braking torques and friction braking torques of a secondary axle may be responsive to other regulation torque frequencies to compensate for inertia of other electric machines providing regenerative braking to the secondary axle and vehicle weight distribution.

The present description may provide several advantages. For example, the approach may improve storage of a vehicle's kinetic energy into electric energy. Further, the approach may reduce the possibility of wheel locking even if the vehicle includes an electric machine with a larger inertia and/or magnetic field. Additionally, the approach compensates wheel torque control during conditions where regenerative braking may be limited because of unusual vehicle operating conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
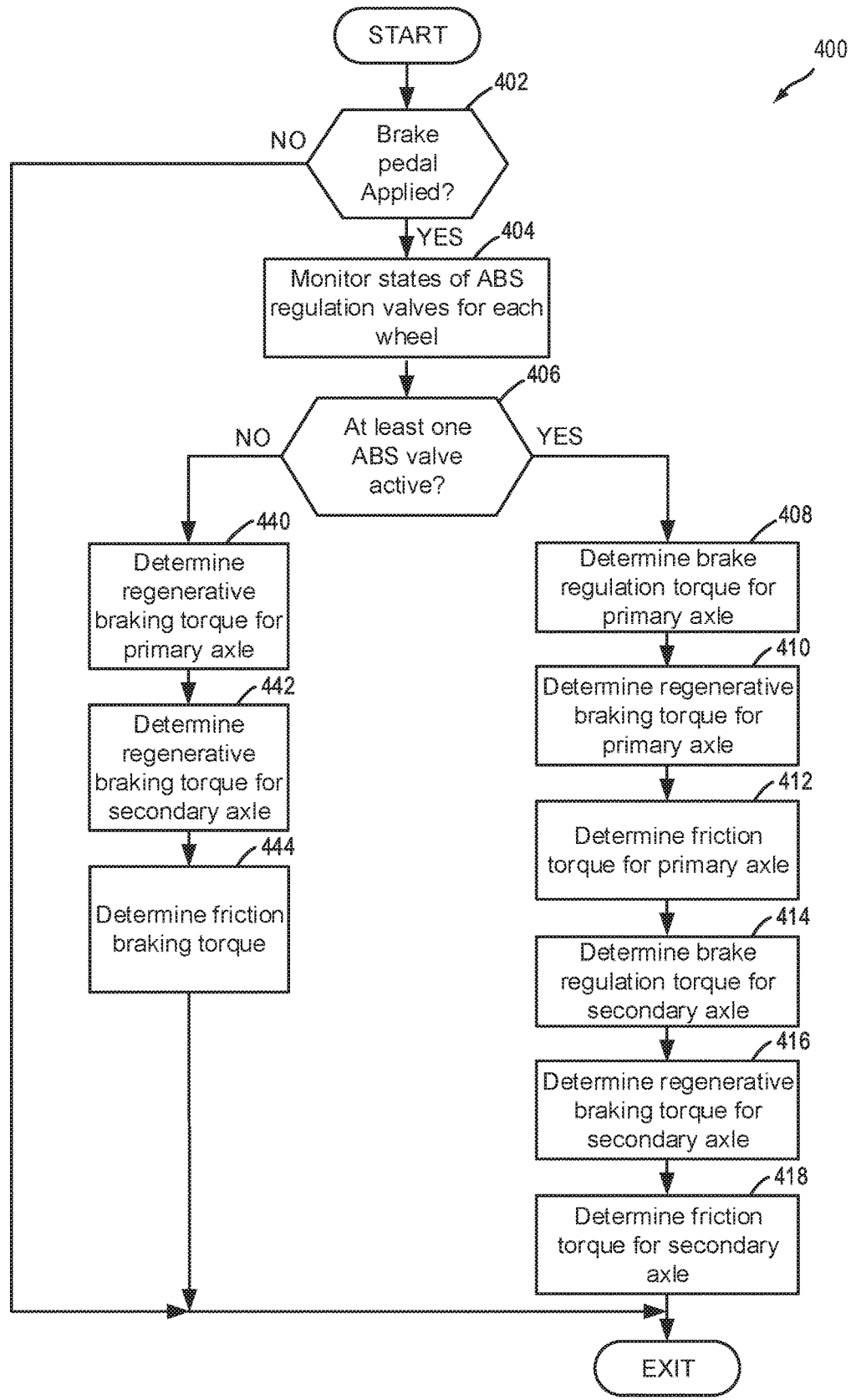
FIG. 4 shows a flowchart of a method for controlling braking of a hybrid vehicle.
Figure 5:
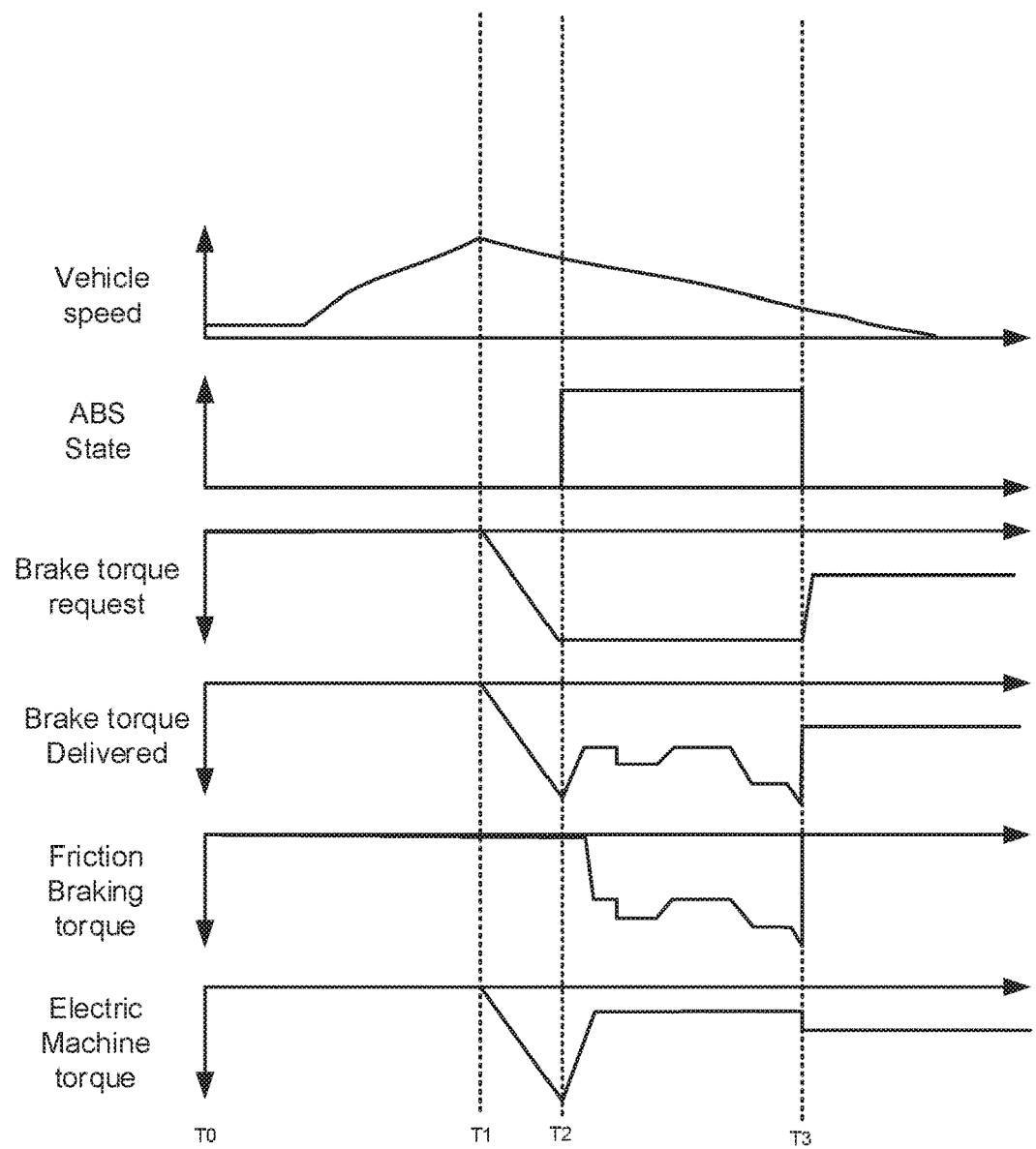
FIG. 5 shows prophetic vehicle operating sequence according to the method of FIG. 4.

The following description relates to systems and methods for operating a driveline of a hybrid vehicle. FIGS. 1A-3 show an example hybrid vehicle system that includes a driveline with an internal combustion engine, an integrated starter/generator, a dual clutch transmission, and an electric machine that may be operated in a regeneration mode to store a vehicle's kinetic as electrical energy. FIG. 4 shows a method for controlling hybrid vehicle braking, and the method includes compensating for vehicle wheel slip. FIG. 5 shows an example vehicle operating sequence according to the method of FIG. 4.

Figure 1A:
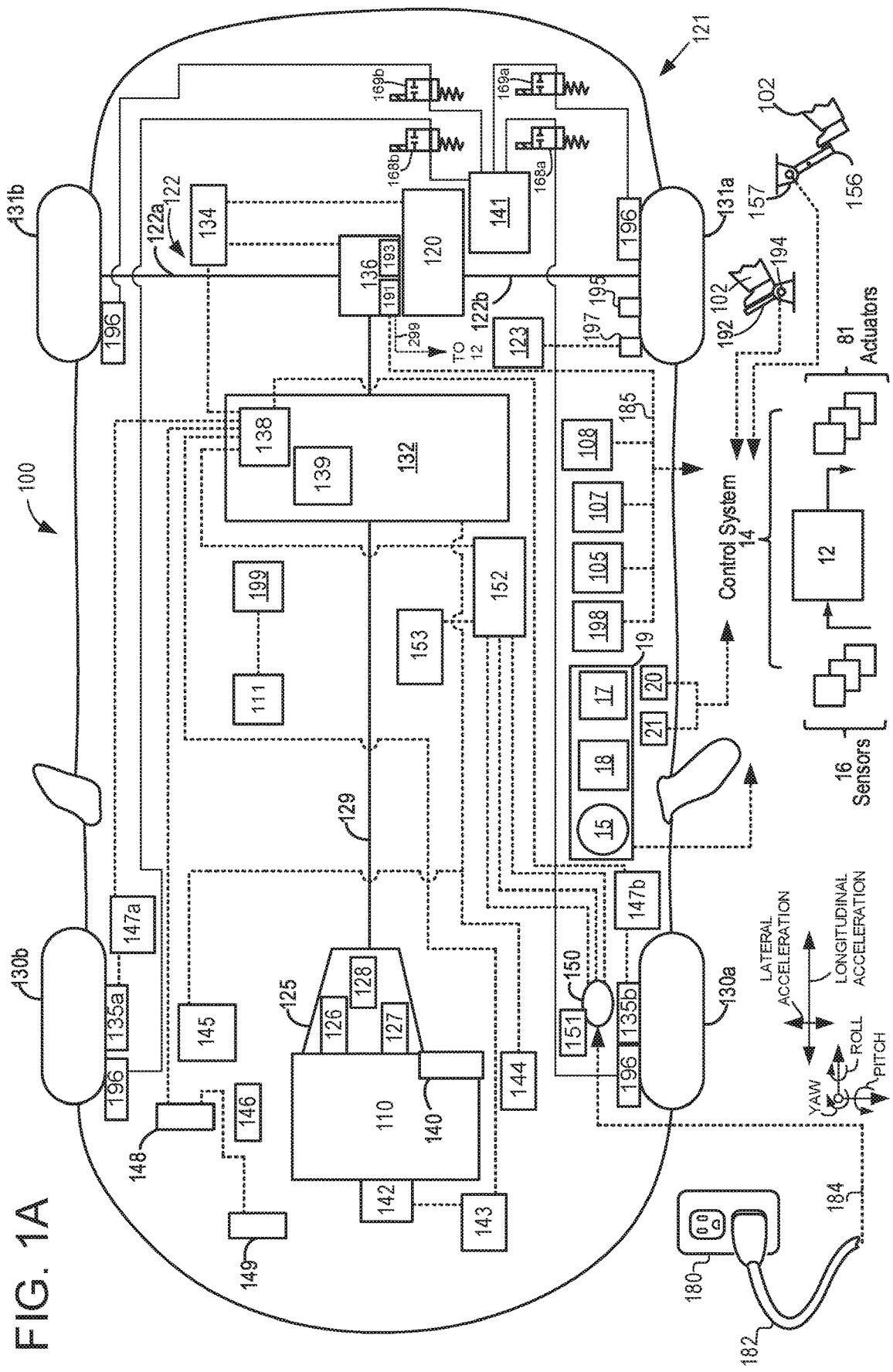
FIG. 1A is a schematic diagram of a hybrid vehicle driveline.

FIG. 1A illustrates an example vehicle propulsion system 100 for vehicle 121. Vehicle propulsion system 100 includes at least two power sources including an internal combustion engine 110 and an electric machine 120. Electric machine 120 may be configured to utilize or consume a different energy source than engine 110. For example, engine 110 may consume liquid fuel (e.g. gasoline) to produce an engine output while electric machine 120 may consume electrical energy to produce an electric machine output. As such, a vehicle with propulsion system 100 may be referred to as a hybrid electric vehicle (HEV). Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122*a*, and second half shaft 122*b*. Vehicle propulsion system 100 further has front wheels 130*a* (left) and 130*b* (right) and rear wheels 131*a* (left) and 131*b* (right). In this example, front wheels 130*a* (left) and 130*b* (right) are not driven and rear wheels 131*a* (left) and 131*b* (right) are driven electrically or via engine 110. The rear axle 122 is coupled to electric machine 120 and to transmission 125 via driveshaft 129. The rear axle 122 may be driven either purely electrically and exclusively via electric machine 120 (e.g., electric only drive or propulsion mode, engine is not combusting air and fuel or rotating), in a hybrid fashion via electric machine 120 and engine 110 (e.g., parallel mode), or exclusively via engine 110 (e.g., engine only propulsion mode), in a purely combustion engine-operated fashion. Rear drive unit 136 may transfer power from engine 110 or electric machine 120, to axle 122, resulting in rotation of drive wheels 131*a* (left) and 131*b* (right). Rear drive unit 136 may include a gear set, differential 193, and an electrically controlled differential clutch 191 that adjusts torque transfer to axle 122*a* and to axle 122*b*. In some examples, electrically controlled differential clutch 191 may communicate a clutch torque capacity (e.g., an amount of torque the clutch may transfer and it may increase in response to an increasing force applied to close the clutch) of the electrically controlled differential clutch via CAN bus 299. Torque transfer to axle 122*a* and 122*b* may be equal when electrically controlled differential clutch is open. Torque transfer to axle 122*a* may be different from torque transferred to axle 122*b* when electrically controlled differential clutch 191 is partially closed (e.g., slipping such that speed input to the clutch is different than speed output of the clutch) or closed. Rear drivel unit 136 may also include one or more clutches (not shown) to decouple transmission 125 and electric machine 120 from wheels 131*a* (left) and 131*b* (right). Rear drive unit 136 may be directly coupled to electric machine 120 and axle 122. In some examples, a motor positioned directly downstream of transmission 125 in the direction of positive torque flow from the engine 110 may be substituted for rear drive unit 136.

A transmission 125 is illustrated in FIG. 1A as connected between engine 110, and electric machine 120 assigned to rear axle 122. In one example, transmission 125 is a dual clutch transmission (DCT). In an example wherein transmission 125 is a DCT, DCT may include a first clutch 126, a second clutch 127, and a gear box 128. DCT 125 outputs torque to drive shaft 129 to supply torque to wheels 131*a* (left) and 131*b* (right). As will be discussed in further detail below with regard to FIG. 2, transmission 125 may shift gears by selectively opening and closing first clutch 126 and second clutch 127.

Electric machine 120 may receive electrical power from onboard electrical energy storage device 132. Furthermore, electric machine 120 may provide a generator function to convert engine output or the vehicle's kinetic energy into electrical energy, where the electrical energy may be stored at electric energy storage device 132 for later use by the electric machine 120 or integrated starter/generator 142. A first inverter system controller (ISC1) 134 may convert alternating current generated by electric machine 120 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of engine 110, electric machine 120, energy storage device 132, integrated starter/generator 142, transmission 125, etc. Control system 14 may receive sensory feedback information from one or more of engine 110, electric machine 120, energy storage device 132, integrated starter/generator 142, transmission 125, etc. Further, control system 14 may send control signals to one or more of engine 110, electric machine 120, energy storage device 132, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source 180 (e.g., a stationary power grid) residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 132 from power source 180 via an electrical energy transmission cable 182. During a recharging operation of energy storage device 132 from power source 180, electrical transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electrical energy from power source 180 may be received by charger 152. For example, charger 152 may convert alternating current from power source 180 to direct current (DC), for storage at energy storage device 132. Furthermore, a DC/DC converter 153 may convert a source of direct current from charger 152 from one voltage to another voltage. In other words, DC/DC converter 153 may act as a type of electric power converter.

While the vehicle propulsion system is operated to propel the vehicle, electrical transmission cable 182 may be disconnected between power source 180 and energy storage device 132. Control system 14 may identify and/or control the amount of electrical energy stored at the energy storage device, which may be referred to as the state of charge (SOC).

In other examples, electrical transmission cable 182 may be omitted, where electrical energy may be received wirelessly at energy storage device 132 from power source 180. For example, energy storage device 132 may receive electrical energy from power source 180 via one or more of electromagnetic induction, radio waves, and electromagnetic resonance. As such, it should be appreciated that any suitable approach may be used for recharging energy storage device 132 from a power source that does not comprise part of the vehicle. In this way, electric machine 120 may propel the vehicle by utilizing an energy source other than the fuel utilized by engine 110.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

Vehicle propulsion system 100 may also include an ambient temperature/humidity sensor 198, and sensors dedicated to indicating the occupancy-state of the vehicle, for example onboard cameras 105, seat load cells 107, and door sensing technology 108. Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. As one example, inertial sensors 199 may couple to the vehicle's restraint control module (RCM) (not shown), the RCM comprising a subsystem of control system 14. The control system may adjust engine output and/or the wheel brakes to increase vehicle stability in response to sensor(s) 199. In another example, the control system may adjust an active suspension system 111 responsive to input from inertial sensors 199. Active suspension system 111 may comprise an active suspension system having hydraulic, electrical, and/or mechanical devices, as well as active suspension systems that control the vehicle height on an individual corner basis four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, sensors 199 may be electrically coupled to controller 12.

One or more tire pressure monitoring sensors (TPMS) may be coupled to one or more tires of wheels in the vehicle. For example, FIG. 1A shows a tire pressure sensor 197 coupled to wheel 131a (left) and 131b (right) and configured to monitor a pressure in a tire of wheel 131a (left) and 131b (right). While not explicitly illustrated, it may be understood that each of the four tires indicated in FIG. 1A may include one or more tire pressure sensor(s) 197. Furthermore, in some examples, vehicle propulsion system 100 may include a pneumatic control unit 123. Pneumatic control unit may receive information regarding tire pressure from tire pressure sensor(s) 197, and send said tire pressure information to control system 14. Based on said tire pressure information, control system 14 may command pneumatic control unit 123 to inflate or deflate tire(s) of the vehicle wheels. While not explicitly illustrated, it may be understood that pneumatic control unit 123 may be used to inflate or deflate tires associated with any of the four wheels illustrated in FIG. 1A. For example, responsive to an indication of a tire pressure decrease, control system 14 may command pneumatic control system unit 123 to inflate one or more tire(s). Alternatively, responsive to an indication of a tire pressure increase, control system 14 may command pneumatic control system unit 123 to deflate tire(s) one or more tires. In both examples, pneumatic control system unit 123 may be used to inflate or deflate tires to an optimal tire pressure rating for said tires, which may prolong tire life.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Vehicle propulsion system 100 may further include an inclinometer 21.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system, such that wheels (e.g. 130a (left) and 130b (right), 131a (left) and 131b (right)) may maintain tractive contact with the road surface according to driver inputs while braking, which may thus prevent the wheels from locking up, to prevent skidding. In some examples, BSCM may receive input from wheel speed sensors 195. BSCM may selectively monitor and activate anti-lock braking regulation valves 168a-169b. Anti-lock braking regulation valves 168a-168b adjust hydraulic pressure applied to brakes 196 of front wheels 130a (left) and 130b (right). Anti-lock braking regulation valves 169a-169b adjust hydraulic pressure applied to brakes 196 of rear wheels 131a (left) and 131b (right).

Vehicle propulsion system 100 may further include a belt integrated starter/generator (BISG) 142. BISG may produce electric power when the engine 110 is in operation, where the electrical power produced may be used to supply electric devices and/or to charge the onboard storage device 132. As indicated in FIG. 1A, a second inverter system controller (ISC2) 143 may receive alternating current from BISG 142, and may convert alternating current generated by BISG 142 to direct current for storage at energy storage device 132. Integrated starter/generator 142 may also provide torque to engine 110 during engine starting or other conditions to supplement engine torque.

In some examples, vehicle propulsion system 100 may include one or more electric machines 135a and 135b to propel vehicle 121 or to provide regenerative braking via front wheels 130a (left) and 130b (right). Friction brakes 196 may be applied to slow front wheels 130a (left) and 130b (right). Third inverter (ISC3) 147a may convert alternating current generated by electric machine 135a to direct current for storage at the electric energy storage device 132 or provide alternating current to electric machine 135a to propel vehicle 121. Likewise, fourth inverter (ISC4) 147b may convert alternating current generated by electric machine 135b to direct current for storage at the electric energy storage device 132 or provide alternating current to electric machine 135b to propel vehicle 121. Electric machines 135a and 135b may be collectively referred to as front wheel electric machines. Alternatively, a single front wheel electric machine may drive and/or provide regenerative braking to both front wheels 130a (left) and 130b (right) as shown in FIG. 1C.

Vehicle propulsion system 100 may further include a power distribution box (PDB) 144. PDB 144 may be used for routing electrical power throughout various circuits and accessories in the vehicle's electrical system.

Vehicle propulsion system 100 may further include a high current fuse box (HCFB) 145, and may comprise a variety of fuses (not shown) used to protect the wiring and electrical components of vehicle propulsion system 100.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, ambient temperature/humidity sensor 198, onboard cameras 105, seat load cells 107, door sensing technology 108, inertial sensors 199, etc. In some examples, sensors associated with engine 110, transmission 125, electric machine 120, etc., may communicate information to controller 12, regarding various states of engine, transmission, and motor operation, as will be discussed in further detail with regard to FIG. 1B, FIG. 2 and FIG. 3.

Vehicle propulsion system 100 may further include a positive temperature coefficient (PTC) heater 148. As an example, PTC heater 148 may comprise a ceramic material such that when resistance is low, the ceramic material may accept a large amount of current, which may result in a rapid warming of the ceramic element. However, as the element warms and reaches a threshold temperature, the resistance may become very large, and as such, may not continue to produce much heat. As such, PTC heater 148 may be self-regulating, and may have a good degree of protection from overheating.

Vehicle propulsion system 100 may further include an air conditioning compressor module 149, for controlling an electric air conditioning compressor (not shown).

Vehicle propulsion system 100 may further include a vehicle audible sounder for pedestrians (VASP) 154. For example, VASP 154 may be configured to produce audible sounds via sounders 155. In some examples, audible sounds produced via VASP 154 communicating with sounders 155 may be activated responsive to a vehicle operator triggering the sound, or automatically, responsive to engine speed below a threshold or detection of a pedestrian.

Vehicle propulsion system 100 may also include an onboard navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110, BISG 142, DCT 125, and electric machine 120) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle. Other examples may include a passive key that is communicatively coupled to the operator ignition interface 15. The passive key may be configured as an electronic key fob or a smart key that does not have to be inserted or removed from the ignition interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine. The controllers (e.g., 12, 111$b$, 139, etc.) receive signals from the various sensors of FIGS. 1A-3 and employ the various actuators of FIGS. 1A-3 to adjust vehicle operation based on the received signals and instructions stored in memory of the controllers.

Figure 1B:
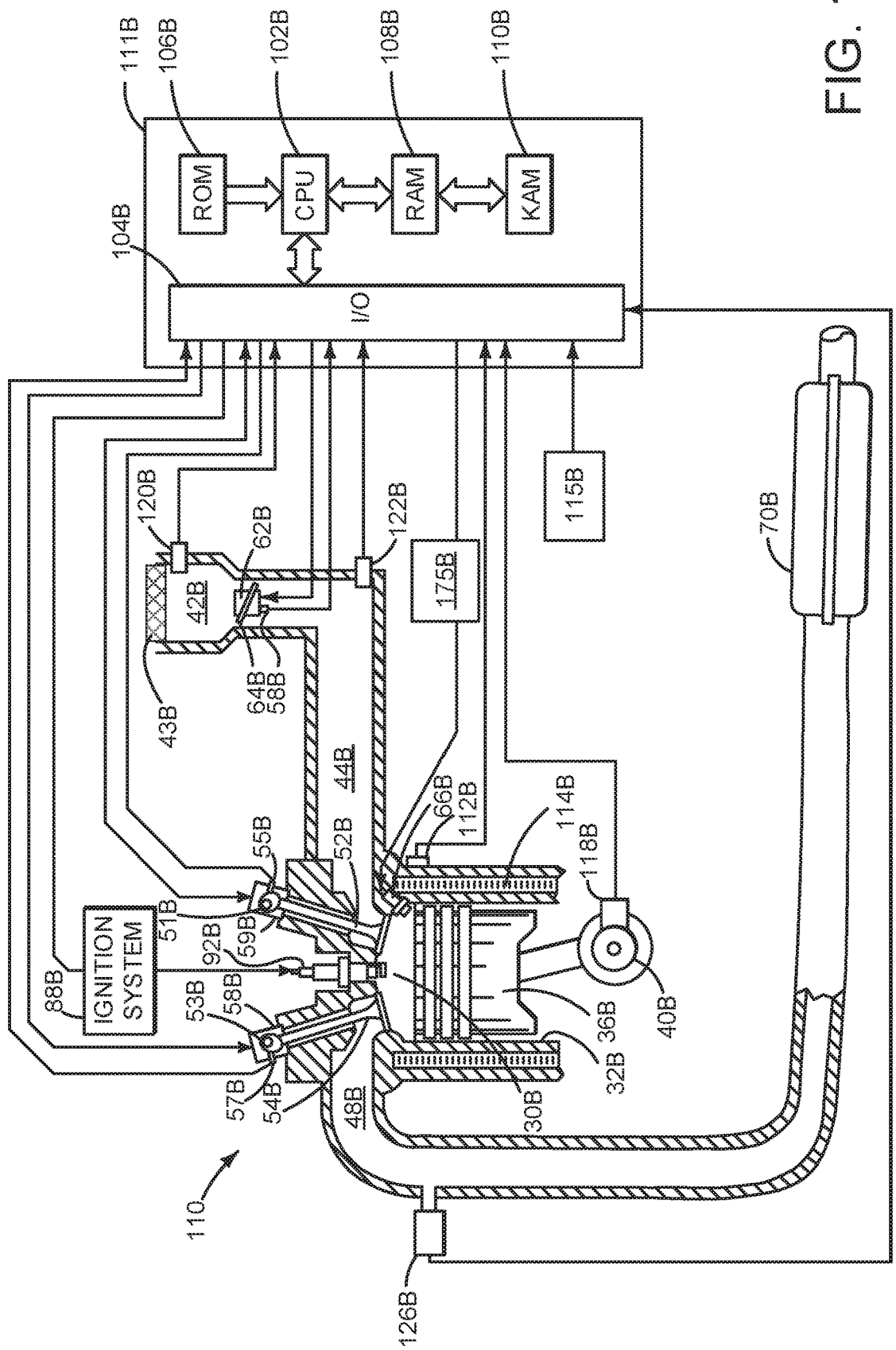
FIG. 1B is a sketch of an engine of the hybrid vehicle driveline.
Figure 1C:
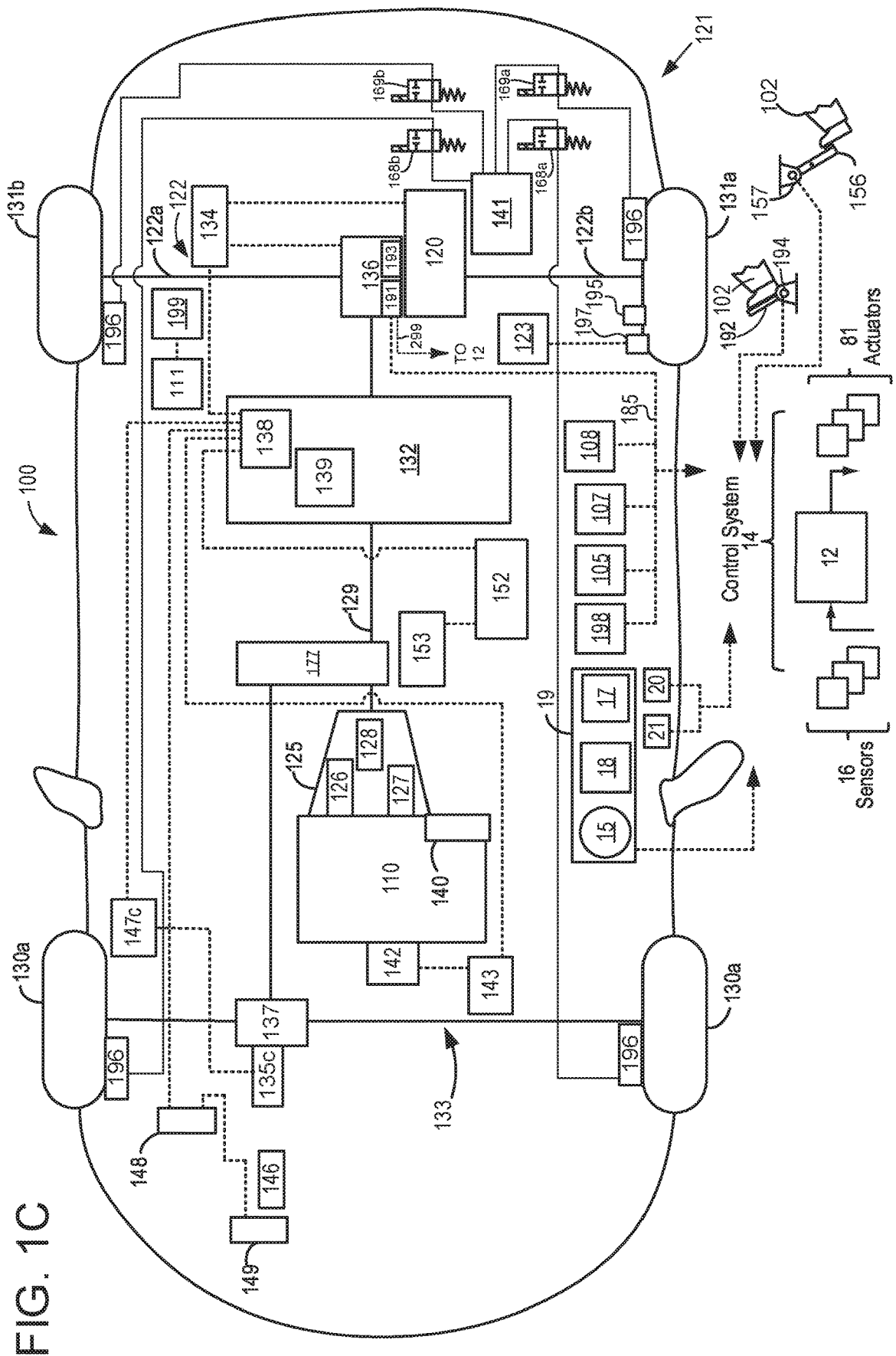
FIG. 1C is a schematic diagram of an alternative hybrid vehicle driveline.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Engine controller 111B is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Engine controller 111B is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Engine controller 111B may receive input from human/machine interface 115B (e.g., pushbutton or touch screen display).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

FIG. 1C is a schematic of an alternative hybrid vehicle driveline. The components of the hybrid vehicle driveline shown in FIG. 1C that are the same as the components shown in FIG. 1A are identified with the same numbering used in FIG. 1A. Components that are unique to the configuration of FIG. 1C are identified with new component numbers. In this configuration, the hybrid vehicle driveline includes a front axle 133. Electric machine 135c may provide positive or negative torque to front wheels 130a (left) and 130b (right) via front drive unit 137, which may include a differential. Alternatively, positive or negative torque may be provided to front wheels 130a (left) and 130b (right) via all-wheel drive transfer case 177, which may be coupled to transmission 125. In some examples, the electric machine 135c and the front drive unit 137 are considered part of front axle 133. Thus, front axle 133 may provide regenerative braking or torque to propel vehicle 121. Further, electric machine 135c may receive electrical power from, or provide electrical power to, electric energy storage device 132. Front axle 133 may be referred to as an independently driven axle. The other components shown in FIG. 1C may operate as previously described.

Figure 2:
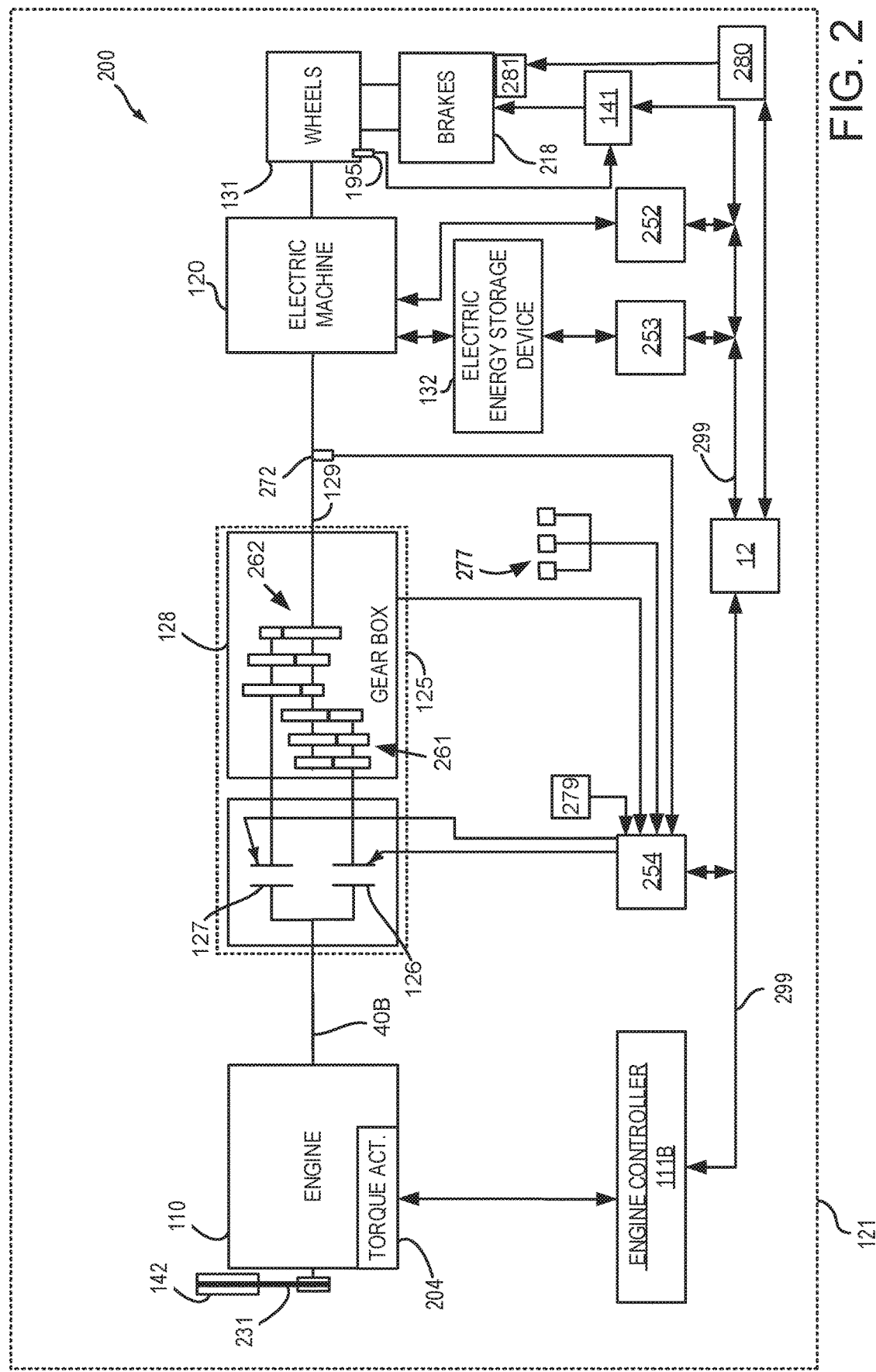
FIG. 2 is a schematic diagram of the hybrid vehicle driveline including controllers of various driveline components.

FIG. 2 is a block diagram of vehicle 121 including a powertrain or driveline 200. The powertrain of FIG. 2 includes engine 110 shown in FIG. 1A-C. Other components of FIG. 2 that are common with FIGS. 1A and 1C are indicated by like numerals, and will be discussed in detail below. Powertrain 200 is shown including vehicle system controller 12, engine controller 111B, electric machine controller 252, transmission controller 254, energy storage device controller 253, and brake controller 141 (also referred to herein as brake system control module). The controllers may communicate over controller area network (CAN) 299. Each of the controllers may provide information to other controllers such as torque output limits (e.g. torque output of the device or component being controlled not to be exceeded), torque input limits (e.g. torque input of the device or component being controlled not to be exceeded), torque output of the device being controlled, sensor an actuator data, diagnostic information (e.g. information regarding a degraded transmission, information regarding a degraded engine, information regarding a degraded electric machine, information regarding degraded brakes). Further, the vehicle system controller 12 may provide commands to engine controller 111B, electric machine controller 252, transmission controller 254, and brake controller 141 to achieve driver input requests and other requests that are based on vehicle operating conditions.

For example, in response to a driver releasing an accelerator pedal and vehicle speed decreasing, vehicle system controller 12 may request a desired wheel torque or wheel power level to provide a desired rate of vehicle deceleration. The desired wheel torque may be provided by vehicle system controller 12 requesting a first braking torque from electric machine controller 252 and a second braking torque from brake controller 141, the first and second torques providing the brake regulation torque at vehicle wheels 131a (left) and 131b (right).

In other examples, the partitioning of controlling powertrain devices may be partitioned differently than is illustrated in FIG. 2. For example, a single controller may take the place of vehicle system controller 12, engine controller 111B, electric machine controller 252, transmission controller 254, and brake controller 141. Alternatively, the vehicle system controller 12 and the engine controller 111B may be a single unit while the electric machine controller 252, the transmission controller 254, and the brake controller 141 may be standalone controllers.

In this example, powertrain 200 may be powered by engine 110 and electric machine 120. In other examples, engine 110 may be omitted. Engine 110 may be started with an engine starter (e.g. 140), via belt integrated starter/generator (BISG) 142, or via electric machine 120. In some examples, BISG 142 may be coupled directly to the engine crankshaft at either end (e.g., front or back) of the crankshaft. Electric machine 120 (e.g. high voltage electric machine, operated with greater than 30 volts), is also referred to herein as electric machine, motor, and/or generator. Further, torque of engine 110 may be adjusted via a torque actuator 204, such as a fuel injector, throttle, etc.

BISG 142 is mechanically coupled to engine 110 via belt 231. BISG 142 may be coupled to a crankshaft (not shown) or a camshaft (not shown). BISG 142 may operate as a motor when supplied with electrical power via electric energy storage device 132, also referred to herein as onboard energy storage device 132. BISG 142 may additionally operate as a generator supplying electrical power to electric energy storage device 132.

Driveline 200 includes engine 110 mechanically coupled to dual clutch transmission (DCT) 125 via crank shaft 40B. DCT 125 includes a first clutch 126, a second clutch 127, and a gear box 128. DCT 125 outputs torque to shaft 129, to supply torque to vehicle wheels 131a (left) and 131b (right). Transmission controller 254 selectively opens and closes first clutch 126 and second clutch 127 to shift DCT 125.

Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 110 to dual clutch transmission 125.

Electric machine 120 may be operated to provide torque to powertrain 200 or to convert powertrain torque into electrical energy to be stored in electrical energy storage device 132 in a regeneration mode. Additionally, electric machine 120 may convert the vehicle's kinetic energy into electrical energy for storage in electric energy storage device 132. Electric machine 120 is in electrical communication with energy storage device 132. Electric machine 120 has a higher output torque capacity than starter (e.g. 140) depicted in FIG. 1A, or BISG 142. Further, electric machine 120 directly drives powertrain 200, or is directly driven by powertrain 200.

Electrical energy storage device 132 (e.g. high voltage battery or power source) may be a battery, capacitor, or inductor. Electric machine 120 is mechanically coupled to wheels 131a (left) and 131b (right) and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131a (left) and 131b (right) by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131a (left) and 131b (right) by disengaging wheel brakes 218 in response to the driver releasing his foot from a brake pedal, brake controller instructions, and/or vehicle system controller instructions and/or information. For example, vehicle brakes may apply a frictional force to wheels 131a (left) and 131b (right) via controller 141 as part of an automated engine stopping procedure.

Vehicle system controller 12 may also communicate vehicle suspension settings to suspension controller 280. The suspension (e.g. 111) of vehicle 121 may be adjusted to critically damp, over damp, or under damp the vehicle suspension via variable dampeners 281.

Accordingly, torque control of the various powertrain components may be supervised by vehicle system controller 12 with local torque control for the engine 110, transmission 125, electric machine 120, and brakes 218 provided via engine controller 111B, electric machine controller 252, transmission controller 254, and brake controller 141.

As one example, an engine torque output may be controlled by adjusting a combination of spark timing, fuel pulse width, fuel pulse timing, and/or air charge, by controlling throttle (e.g. 62B) opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from electric machine 120 by adjusting current flowing to and from field and/or armature windings of electric machine 120 as is known in the art.

Transmission controller 254 may receive transmission output shaft torque from torque sensor 272. Alternatively, sensor 272 may be a position sensor or torque and position sensors. If sensor 272 is a position sensor, transmission controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 111B, and vehicle system controller 12, may also receive additional transmission information from sensors 277, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, and ambient temperature sensors. Transmission controller may also receive a requested transmission state (e.g., requested gear or park mode) from shift selector 279, which may be a lever, switches, or other device.

Brake controller 141 receives wheel speed information via wheel speed sensor 195 and braking requests from vehicle system controller 12. Brake controller 141 may also receive brake pedal position information from brake pedal sensor (e.g. 157) shown in FIG. 1A directly or over CAN 299. Brake controller 141 may provide braking responsive to a wheel torque command from vehicle system controller 12. Brake controller 141 may also provide anti-lock and vehicle stability braking to improve vehicle braking and stability. As such, brake controller 141 may provide a wheel torque limit (e.g., a threshold negative wheel torque not to be exceeded) to the vehicle system controller 12 so that negative motor torque does not cause the wheel torque limit to be exceeded. For example, if controller 12 issues a negative wheel torque limit of 50 N-m, motor torque may be adjusted to provide less than 50 N-m (e.g., 49 N-m) of negative torque at the wheels, including accounting for transmission gearing.

Positive torque may be transmitted to vehicle wheels 131a (left) and 131b (right) in a direction starting at engine 110 and ending at wheels 131a (left) and 131b (right). Thus, according to the direction of positive torque flow in driveline 200, engine 110 is positioned in driveline 200 upstream of transmission 125. Transmission 125 is positioned upstream of electric machine 120, and BISG 142 may be positioned upstream of engine 110, or downstream of engine 110 and upstream of transmission 125.

Figure 3:
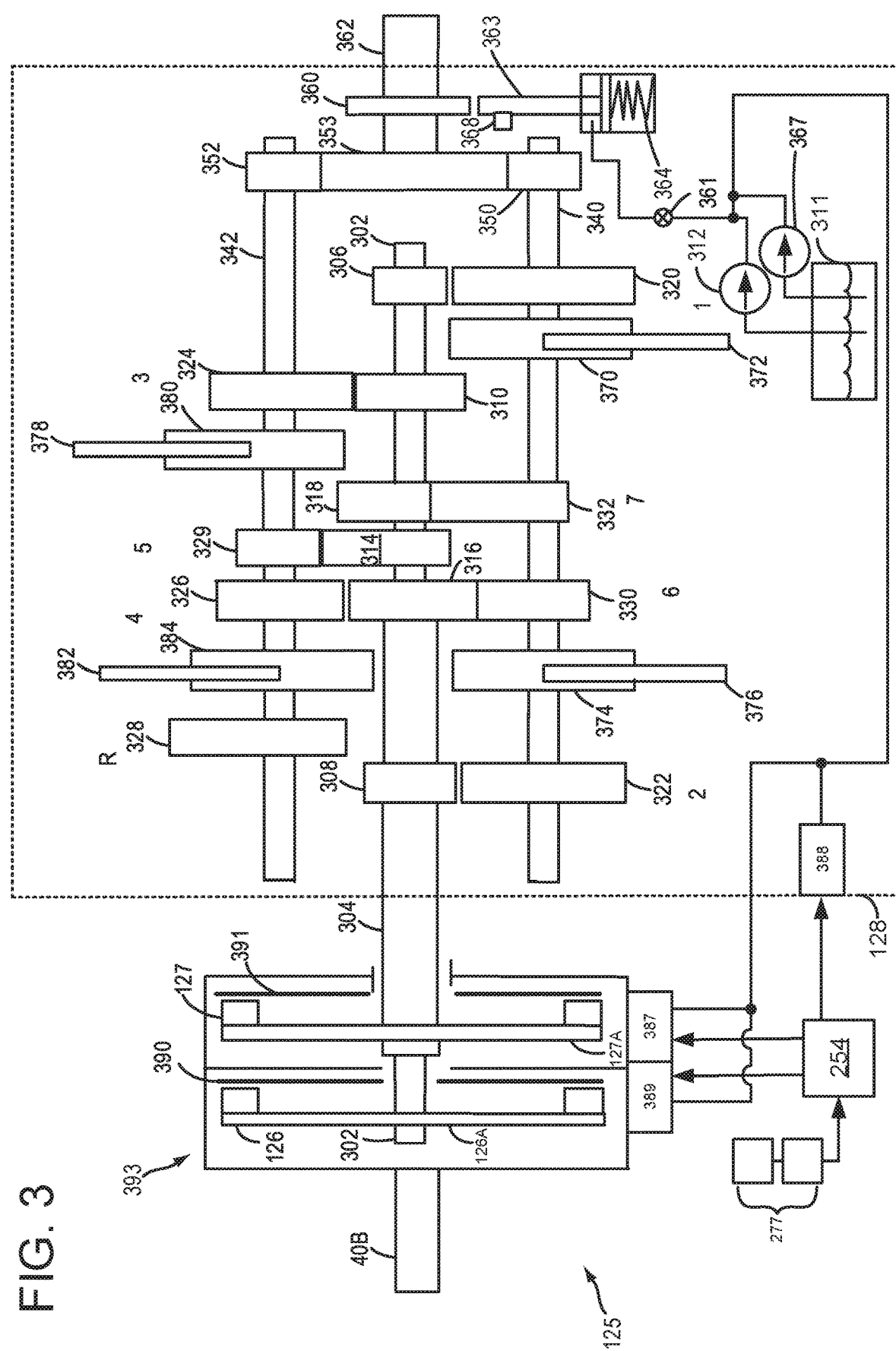
FIG. 3 is a schematic diagram of a dual clutch transmission located in the hybrid vehicle driveline.

FIG. 3 shows a detailed illustration of a dual clutch transmission (DCT) 125. Engine crankshaft 40B is illustrated as coupling to a clutch housing 393. Alternatively, a shaft may couple crankshaft 40B to clutch housing 393. Clutch housing 393 may spin in accordance with rotation of crankshaft 40B. Clutch housing 393 may include a first clutch 126 and a second clutch 127. Furthermore, each of first clutch 126 and second clutch 127 have an associated first clutch plate 390, and a second clutch plate 391, respectively. In some examples, the clutches may comprise wet clutches, bathed in oil (for cooling), or dry plate clutches. Engine torque may be transferred from clutch housing 393 to either first clutch 126 or second clutch 127. First transmission clutch 126 transfers torque between engine 110 (shown in FIG. 1A) and first transmission input shaft 302. As such, clutch housing 393 may be referred to as an input side of first transmission clutch 126 and 126A may be referred to as an output side of first transmission clutch 126. Second transmission clutch 127 transfers torque between engine 110 (shown in FIG. 1A) and second transmission input shaft 304. As such, clutch housing 393 may be referred to as an input side of second transmission clutch 127 and 127A may be referred to as an output side of second transmission clutch 127.

A gear box 128 may include a plurality of gears, as discussed above. There are two transmission input shafts, including first transmission input shaft 302, and second transmission input shaft 304. Second transmission input shaft 304 is hollow, while first transmission input shaft 302 is solid, and sits coaxially within the second transmission input shaft 304. As an example, first transmission input shaft 302 may have a plurality of fixed gears. For example, first transmission input shaft 302 may include first fixed gear 306 for receiving first gear 320, third fixed gear 310 for receiving third gear 324, fifth fixed gear 314 for receiving fifth gear 329, and seventh fixed gear 318 for receiving seventh gear 332. In other words, first transmission input shaft 302 may be selectively coupled to a plurality of odd gears. Second transmission input shaft 304 may include second fixed gear 308 for receiving second gear 322, or a reverse gear 328, and may further include fourth fixed gear 316, for receiving either fourth gear 326 or sixth gear 330. It may be understood that both first transmission input shaft 302 and second transmission input shaft 304 may be connected to each of first clutch 126 and second clutch 127 via spines (not shown) on the outside of each shaft, respectively. In a normal resting state, each of first clutch 302 and second clutch 304 are held open, for example via springs (not shown), etc., such that no torque from engine (e.g. 110) may be transmitted to first transmission input shaft 302 or second transmission input shaft 304 when each of the respective clutches are in an open state. Responsive to closing first clutch 126, engine torque may be transmitted to first transmission input shaft 302, and responsive to closing second clutch 127, engine torque may be transmitted to second transmission input shaft 304. During normal operation, transmission electronics may ensure that only one clutch is closed at any given time.

Gear box 128 may further include a first layshaft shaft 340, and second layshaft shaft 342. Gears on first layshaft shaft 340 and second layshaft shaft 342 are not fixed, but may freely rotate. In example DCT 125, first layshaft shaft 340 includes first gear 320, second gear 322, sixth gear 330, and seventh gear 332. Second layshaft shaft 342 includes third gear 324, fourth gear 326, fifth gear 329, and reverse gear 328. Both first layshaft shaft 340 and second layshaft shaft 342 may transfer torque via a first output pinion 350, and a second output pinion 352, respectively, to gear 353. In this way, both layshafts may transfer torque via each of first output pinion 350 and second output pinion 352, to output shaft 362, where output shaft may transfer torque to a rear drive unit 136 (shown in FIG. 1A) which may enable each of the driven wheels (e.g. 131a (left) and 131b (right) of FIG. 1A) to rotate at different speeds, for example when performing turning maneuvers.

As discussed above, each of first gear 320, second gear 322, third gear 324, fourth gear 326, fifth gear 329, sixth gear 330, seventh gear 332, and reverse gear 328 are not fixed to layshafts (e.g. 340 and 342), but instead may freely rotate. As such, synchronizers may be utilized to enable each of the gears to match the speed of the layshafts, and may further be utilized to lock the gears. In example DCT 125, four synchronizers are illustrated, for example, first synchronizer 370, second synchronizer 374, third synchronizer 380, and fourth synchronizer 382. First synchronizer 370 includes corresponding first selector fork 372, second synchronizer 374 includes corresponding selector fork 376, third synchronizer 380 includes corresponding third selector fork 378, and fourth synchronizer 384 includes corresponding fourth selector fork 382. Each of the selector forks may enable movement of each corresponding synchronizer to lock one or more gears, or to unlock one or more gears. For example, first synchronizer 370 may be utilized to lock either first gear 320 or seventh gear 332. Second synchronizer 374 may be utilized to lock either second gear 322 or sixth gear 330. Third synchronizer 380 may be utilized to lock either third gear 324 or fifth gear 329. Fourth synchronizer 384 may be utilized to lock either fifth gear 326, or reverse gear 328. In each case, movement of the synchronizers may be accomplished via the selector forks (e.g. 372, 376, 378, and 382) moving each of the respective synchronizers to the desired position.

Movement of synchronizers via selector forks may be carried out via transmission control module (TCM) 254 and shift fork actuators 388, where TCM 254 may comprise TCM 254 discussed above with regard to FIG. 2. Shift fork actuators may be operated electrically, hydraulically, or a combination of electric and hydraulic. Hydraulic power may be provided via pump 312 and/or pump 367. TCM 254 may collect input signals from various sensors, assess the input, and control various actuators accordingly. Inputs utilized by TCM 254 may include but are not limited to transmission range (P/R/N/D/S/L, etc.), vehicle speed, engine speed and torque, throttle position, engine temperature, ambient temperature, steering angle, brake inputs, gear box input shaft speed (for both first transmission input shaft 302 and second transmission input shaft 304), vehicle attitude (tilt). The TCM may control actuators via an open-loop control, to allow for adaptive control. For example, adaptive control may enable TCM 254 to identify and adapt to clutch engagement points, clutch friction coefficients, and position of synchronizer assemblies. TCM 254 may also adjust first clutch actuator 389 and second clutch actuator 387 to open and close first clutch 126 and second clutch 127. First clutch actuator 389 and second clutch actuator 387 may be operated electrically, hydraulically, or a combination of electric and hydraulic. Hydraulic power may be provided via pump 312 and/or pump 367.

As such, TCM 254 is illustrated as receiving input from various sensors 277. As discussed above with regard to FIG. 2, the various sensors may include pump output line pressure sensors, transmission hydraulic pressure sensors (e.g. gear clutch fluid pressure sensors), motor temperature sensors, shifter position sensors, synchronizer position sensors, and ambient temperature sensors. The various sensors 277 may further include wheel speed sensors (e.g. 195), engine speed sensors, engine torque sensors, throttle position sensors, engine temperature sensors, steering angle sensors, transmission fork position sensors for detecting positions of selector forks (e.g. 372, 376, 378, 382), and inertial sensors (e.g. 199). Inertial sensors may comprise one or more of the following: longitudinal, latitudinal, vertical, yaw, roll, and pitch sensors, as discussed above with regard to FIG. 1A.

Sensors 277 may further include an input shaft speed (ISS) sensor, which may include a magneto-resistive sensor, and where one ISS sensor may be included for each gear box input shaft (e.g. one for first transmission input shaft 302 and one for second transmission input shaft 304). Sensors 277 may further include an output shaft speed sensor (OSS), which may include a magneto-resistive sensor, and may be attached to output shaft 362. Sensors 277 may further include a transmission range (TR) sensor.

DCT 125 may be understood to function as described herein. For example, when first clutch 126 is actuated closed, engine torque may be supplied to first transmission input shaft 302. When first clutch 126 is closed, it may be understood that second clutch 127 is open, and vice versa. Depending on which gear is locked when first clutch 126 is closed, power may be transmitted via the first transmission input shaft 302 to either first layshaft 340 or second layshaft 342, and may be further transmitted to output shaft 362 via either first pinion gear 350 or second pinion gear 352. Alternatively, when second clutch 127 is closed, power may be transmitted via the second transmission input shaft 304 to either first layshaft 340 or second layshaft 342, depending on which gear is locked, and may be further transmitted to output shaft 362 via either first pinion gear 350 or second pinion gear 352. It may be understood that when torque is being transferred to one layshaft (e.g. first output shaft 340), the other layshaft (e.g. second output shaft 342) may continue to rotate even though only the one shaft is driven directly by the input. More specifically, the non-engaged shaft (e.g. second layshaft 342) may continue to rotate as it is driven indirectly by the output shaft 362 and respective pinion gear (e.g. 352).

DCT 125 may enable preselection of gears, which may thus enable rapid switching between gears with minimal loss of torque during shifting. As an example, when first gear 320 is locked via first synchronizer 340, and wherein first clutch 126 is closed (and second clutch 127 is open), power may be transmitted from the engine to first input shaft 302, and to first layshaft 340. While first gear 320 is engaged, second gear 322 may simultaneously be locked via second synchronizer 374. Because second gear 322 is locked, this may rotate second input shaft 304, where the second input shaft 304 is speed matched to the vehicle speed in second gear. In an alternative case where a gear is pre-selected on the other layshaft (e.g. second layshaft 342), that layshaft will also rotate as it is driven by output shaft 362 and pinion 352.

When a gear shift is initiated by TCM 254, only the clutches need to be actuated to open first clutch 126 and close second clutch 127. Furthermore, outside the TCM, engine speed may be lowered to match the upshift. With the second clutch 127 closed, power may be transmitted from the engine, to second input shaft 304, and to first layshaft 340, and may be further transmitted to output shaft 362 via pinion 350. Subsequent to the shifting of gears being completed, TCM 254 may pre-select the next gear appropriately. For example, TCM 254 may pre-select either a higher or a lower gear, based on input it receives from various sensors 277. In this way, gear changes may be achieved rapidly with minimal loss of engine torque provided to the output shaft 362.

Dual clutch transmission 300 may in some examples include a parking gear 360. A parking pawl 363 may face parking gear 360. When a shift lever is set to park, park pawl 363 may engage parking gear 360. Engagement of parking pawl 363 with parking gear 360 may be accomplished via a parking pawl spring 364, or may be achieved via a cable (not shown), a hydraulic piston (not shown) or a motor (not shown), for example. When parking pawl 363 is engaged with parking gear 360, driving wheels (e.g. 130a (left) and 130b (right), 131a (left) and 131b (right)) of a vehicle may be locked. On the other hand, responsive to the shift lever being moved from park, to another selection (e.g. drive), parking pawl 363 may move such that parking pawl 363 may be disengaged from parking gear 360.

In some examples, an electric transmission pump 312 may supply hydraulic fluid from transmission sump 311 to compress spring 364, in order to release parking pawl 363 from parking gear 360. Electric transmission pump 312 may be powered by an onboard energy storage device (e.g. 132), for example. In some examples, a mechanical pump 367 may additionally or alternatively supply hydraulic fluid from transmission sump 311 to compress spring 364 to release parking pawl 363 from parking gear 360. While not explicitly illustrated, mechanical pump may be driven by the engine (e.g. 110), and may be mechanically coupled to clutch housing 393. A park pawl valve 361 may regulate the flow of hydraulic fluid to spring 364, in some examples.

Thus, the system of FIGS. 1A-3 provides for a vehicle system, comprising: an anti-lock friction braking system including four friction brakes; a first electric machine; a second electric machine; and a controller including executable instructions stored in non-transitory memory that cause the controller to filter wheel torques of a first axle via a first low pass filter having a first cut-off frequency and to filter wheel torques of a second axle via second low pass filter having a second cut-off frequency. The vehicle system further comprises additional instructions to adjust a regeneration torque of a primary axle to the lower magnitude value of the low pass filtered primary axle regulation torque of the right wheel and the low pass filtered primary axle regulation torque of the left wheel. The vehicle system further comprises additional instructions to adjusting a regeneration torque of a secondary axle to the lower magnitude value of the low pass filtered secondary axle regulation torque of the right wheel and the low pass filtered secondary axle regulation torque of the right wheel. The vehicle system further comprises additional instructions to apply at least one of the four friction brakes in response to activating the anti-lock friction braking system. The vehicle system includes where the first cut-off frequency is lower than the second cut-off frequency. The vehicle system includes where the first cut-off frequency is based on both inertia of the first electric machine and its drivetrain compliance, where the second cut-off frequency is based on inertia of the second electric machine and its drivetrain compliance, and where the first and second electric machines provide torque to a vehicle driveline.

Referring now to FIG. 4, an example method for operating a hybrid driveline to improve driveline efficiency via regeneration is shown. The method of FIG. 4 may be incorporated into and may cooperate with the system of FIGS. 1A-3. Further, at least portions of the method of FIG. 4 may be incorporated as executable instructions stored in non-transitory memory while other portions of the method may be performed via a controller transforming operating states of devices and actuators in the physical world. The friction braking torques and regenerative braking torques described in the method of FIG. 4 may be applied to reduce speed of a wheel. Instructions for carrying out method 400 may be executed by a controller based on instructions stored in memory of the controller and in conjunction with signals received from sensors of the engine system, such as the sensors described above with reference to FIGS. 1A-3. The controller may employ engine actuators of the engine system to adjust engine operation, according to the methods described below.

At 402, method 400 judges if a vehicle brake pedal is applied. Method 400 may judge that the brake pedal is applied in response to a position of the brake pedal as determined via a brake pedal position sensor. If method 400 judges that the brake pedal is applied, the answer is yes and method 400 proceeds to 404. Otherwise, the answer is no and method 400 proceeds to exit.

At 404, method 400 monitors operating states of anti-lock braking system (ABS) regulation valves for each vehicle wheel. In particular, method 400 judges whether or not one of the anti-lock braking system regulation valves is active or deactivated. The anti-lock braking system regulation valves may be activated when wheel lock is detected during braking. The anti-lock braking system regulation valves are deactivated when wheel lock is not detected during braking. Method 400 proceeds to 406.

At 406, method 400 judges if at least one anti-lock braking regulation valve is active. Method 400 may judge that one or more anti-lock braking regulation valve is active based on an amount of current supplied to the anti-lock braking regulation valve, brake line pressure, or other known means. If method 400 judges that at least one anti-lock braking regulation valve is active, the answer is yes and method 400 proceeds to 408. Otherwise, the answer is no and method 400 proceeds to 440.

At 440, method 400 determines regenerative braking torque for the vehicle's primary axle. In one example, the vehicle's primary axle is the vehicle's axle that receives all driveline power when wheel slip is not detected. The vehicle primary axle in the system of FIGS. 1A-1C is the rear axle, or the axle that drives the rear wheels. The secondary axle is the front axle, or the axle that drives front wheels. In one example, the larger value of the requested brake torque (e.g. a braking torque requested via a human driver), an electric machine torque limit (e.g., a maximum negative electric machine torque), a battery torque charge limit (e.g., a maximum torque provided via the electric machine when electric machine torque is limited to a maximum current the vehicle traction battery may receive), and a vehicle stability torque limit (e.g., a maximum wheel torque for stable vehicle operation) for the primary axle is determined. The requested brake torque, electric machine torque limit, the battery torque charge limit, and the vehicle stability torque limit for the primary axle are all negative values. Therefore, the largest value of the parameters is the value nearest zero. For example, if requested brake torque=−400 N-m, electric machine torque limit=−600 N-m, the battery torque charge limit=−550 N-m, and the vehicle stability torque limit for the primary axle=−500 N-m, then method 400 selects the requested braking torque because its value of −400 N-m is greater than the values of −600, −550, and −500. The regenerative braking torque for the primary axle may be determined via the following equation:

$$Tq\_regen\_PDAxle = \max(Tq\_brakeReq, Tq\_mtrLim, Tq\_battChrgLim, Tq\_vehStabLim\_PDAxle)$$

where $Tq\_regen\_PDAxle$ is the regenerative braking torque for the primary axle, $Tq\_brakeReq$ is the braking torque requested via a human or autonomous driver, $Tq\_mtrLim$ is an electric machine torque limit that may include the RDU electric machine and the ISG/BISG, $Tq\_battChrgLim$ is a battery charging torque limit (e.g., a regenerative braking torque at which the battery cannot accept a higher rate of charging), and $Tq\_vehStabLim\_PDAxle$ is a primary axle torque limit for maintaining vehicle stability. Method 400 proceeds to 442.

At 442, method 400 determines regenerative braking torque for the vehicle's secondary axle. In one example, the vehicle's secondary axle is the vehicle's axle that may receive power from the driveline when positive driveline torque produces wheel slip, but the secondary axle may not receive positive power from the driveline when wheel slip is not detected. The vehicle secondary axle in the system of FIGS. 1A-1C is the front axle, or the axle that drives the front wheels.

Method 400 determines the potential regenerative braking torque for the vehicle including the primary and secondary axles. In one example, the potential regenerative braking torque is larger value of the requested brake torque, an electric machine torque limit, and a battery torque charge limit is determined. The requested brake torque, electric machine torque limit, and the battery torque charge limit are all negative values. The potential vehicle regenerative braking torque may be determined via the following equation:

$$Tq\_regen\_Pot = \max(Tq\_brakeReq, Tq\_mtrLim, Tq\_battChrgLim)$$

where $Tq\_regen\_Pot$ is the potential regenerative braking torque for the vehicle, $Tq\_brakeReq$ is the braking torque requested via a human or autonomous driver, $Tq\_mtrLim$ is an electric machine torque limit that may include the RDU electric machine and the ISG/BISG, and $Tq\_battChrgLim$ is a battery charging torque limit (e.g., a regenerative braking torque at which the battery cannot accept a higher rate of charging). Method 400 also judges if the absolute value of the potential regenerative braking torque for the vehicle ($Tq\_regen\_Pot$) is greater than the absolute value of the regenerative braking torque for the primary axle ($Tq\_regen\_PDAxle$). If not, regenerative braking torque for the secondary axle is zero. If so, regenerative braking torque for the secondary axle is determined by:

$$Tq\_regen\_SDAxle = \max(Tq\_vehStabLim\_SDAxle, Tq\_regen\_Pot - Tq\_regen\_PD\_Axle, Tq\_AWDtrasfCap)$$

where $Tq\_regen\_SDAxle$ is the regenerative braking torque for the vehicle's secondary axle, $Tq\_vehStabLim\_SDAxle$ is a secondary axle torque limit for maintaining vehicle stability, $Tq\_regen\_Pot$ is the potential regenerative braking torque for the vehicle, $Tq\_regen\_PDAxle$ is the regenerative braking torque for the primary axle, and $Tq\_AWDtrasfCap$ is a torque transfer capacity for the all-wheel drive transfer case. Method 400 proceeds to 444.

At 444, method 400 determines friction braking torque. In one example, the friction braking torque is determined via the following equation:

$$Tq\_fric=Tq\_brakeReq-(Tq\_regen\_PDAxle+Tq\_regen\_SD\_Axle)$$

where Tq_fric is the friction braking torque for the vehicle, Tq_brakeReq is the braking torque requested via a human or autonomous driver, Tq_regen_PDAxle is the regenerative braking torque for the primary axle, and Tq_regen_SDAxle is the regenerative braking torque for the vehicle's secondary axle. The friction braking torque may be distributed between the front and rear axles and left and right wheels via a hydraulic regulation circuit or via maps or functions stored in memory of a vehicle braking controller. Method 400 proceeds to exit.

At 408, method 400 determines the brake regulation torque for the primary axle. In one example, the brake regulation torque for the left wheel and right wheel of the primary axle may be determined via the following equations:

$$T_{wheelBrk\_i} = T_{regen\_i} + T_{frcBrk\_i}$$

$$T_{wheelBrk\_i} = f\left((\omega_i \cdot R - v_{ref}), \left(\frac{d\omega_i}{dt}\right)\right)$$

where $T_{wheelBrk\_i}$ is the brake regulation torque for wheel i, and i can be front left (fl), front right (fr), rear left (rl), or rear right (rr), $T_{regen\_i}$ is the regenerative torque applied to wheel i, $T_{frcBrk\_i}$ is friction braking torque for wheel i, ωi is speed of the ith wheel, R is wheel radius, $v_{ref}$ is vehicle reference speed (e.g., speed of the vehicle), and dω$_i$/dt is acceleration of the ith wheel. The brake regulation torque for each wheel is the sum of the regenerative braking torque for the wheel and the friction braking torque for the wheel. The regenerative braking torque for the wheel may be determined from electric machine torque and gear ratios between the electric machine and the respective wheels. Wheel speed may be determined via wheel speed sensors, road angle may be determined via an inclinometer, and wheel inertia may be determined empirically. The braking regulation torque for the primary axle right wheel may be abbreviated as Tq_brakeRequ_PDAxle_L. The braking regulation torque for the primary axle right wheel may be abbreviated as Tq_brakeRequ_PDAxle_R. Method 400 proceeds to 410.

At 410, method 400 determines the regenerative braking torque of the primary axle. In one example, the regenerative braking torque of the primary axle is determined via the following equation:

$$Tq\_regen\_PDAxle=max(lowPassFilter(Tq\_brakeRequ\_PDAxle\_L)*rt\_1,lowPassFilter(Tq\_brakeRequ\_PDAxle\_R)*rt\_2,Tq\_mtrLim,Tq\_battChrgLim,Tq\_vehStabLim\_PDAxle)$$

where Tq_regen_PDAxle is the regenerative braking torque for the primary axle, max is a function that return a greater value of the arguments input to the function max, lowPassFilter(arg1) is a function that provides a low pass filtered value (e.g., a discrete low pass filter may be expressed as y(i)=α$_1$·x(i)+(1−α$_1$)·y(i−1), where y is the low pass filter output, i is the sample number, x is the low pass filter input, and α is a filtering factor) of input arg1, rt_1 is an empirically determined percentage (e.g., 0.1 or 10%, that may vary from 0 to 100%), rt_2 is an empirically determined percentage (e.g., 0.1 or 10%, that may vary from 0 to 100%), Tq_mtrLim is an electric machine torque limit that may include the RDU electric machine and the ISG/BISG, Tq_battChrgLim is a battery charging torque limit (e.g., a regenerative braking torque at which the battery cannot accept a higher rate of charging), and Tq_vehStabLim_PDAxle is a primary axle torque limit for maintaining vehicle stability. All the torque arguments input to function max are negative torques (e.g., Tq_mtrLim=−500 N-m).

Thus, Tq_regen_PDAxle is a fraction of a low pass filtered value of Tq_brakeRequ_PDAxle_L or Tq_brakeRequ_PDAxle_R when the magnitude of each variable Tq_mtrLim, Tq_battChrgLim, and Tq_vehStabLim_PDAxle is greater than the magnitude of Tq_brakeRequ_PDAxle_L or Tq_brakeRequ_PDAxle_R. By determining Tq_regen_PDAxle as a fraction of low pass filtered variable Tq_brakeRequ_PDAxle_L or variable Tq_brakeRequ_PDAxle_R, high frequencies may be eliminated from the primary axle regeneration torque so that driveline noise and vibration may be reduced. Further, the empirically determined multipliers rt_1 and rt_2 may reduce the regenerative braking torque so as to ensure that a portion of braking torque is provided via the highly dynamic friction braking system so that braking effectiveness is maintained. Method 400 proceeds to 412.

At 412, method 400 determines friction braking torque for the primary axle. In one example, method 400 may determine the friction braking torque for the primary axle via the following equations:

$$Tq\_fric\_PDAxle\_L=Tq\_brakeRegu\_PDAxle\_L-Tq\_regen\_PDAxle*0.5$$

$$Tq\_fric\_PDAxle\_R=Tq\_brakeRegu\_PDAxle\_R-Tq\_regen\_PDAxle*0.5$$

where Tq_fric_PDAxle_L is the friction torque for the left wheel of the primary axle, Tq_fric_PDAxle_R is the friction torque for the right wheel of the primary axle, Tq_brakeRegu_PDAxle_L is the regenerative braking torque of the left wheel of the primary axle, Tq_brakeRegu_PDAxle_R is the regenerative braking torque of the right wheel of the primary axle, and Tq_regen_PDAxle is the regenerative braking torque for the primary axle.

Thus, the friction torque of the primary axle left wheel is the braking regulation torque of the primary axle left wheel minus one half the regenerative braking torque of the primary axle left wheel. Similarly, the friction torque of the primary axle right wheel is the braking regulation torque of the primary axle right wheel minus one half the regenerative braking torque of the primary axle right wheel. Method 400 proceeds to 414.

At 414, method 400 determines the brake regulation torque for the secondary axle. In one example, the brake regulation torque for the left wheel and right wheel of the secondary axle may be determined via the following equations:

$$T_{wheelBrk\_i} = T_{regen\_i} + T_{frcBrk\_i}$$

$$T_{wheelBrk\_i} = f\left((\omega_i \cdot R - v_{ref}), \left(\frac{d\omega_i}{dt}\right)\right)$$

where $T_{wheelBrk\_i}$ is the brake regulation torque for wheel i, and i can be front left (fl), front right (fr), rear left (rl), or rear right (rr), $T_{regen\_i}$ is the regenerative torque applied to wheel i, $T_{frcBrk\_i}$ is friction braking torque for wheel I, ω$_i$ is speed of the ith wheel, R is wheel radius, $v_{ref}$ is vehicle reference speed (e.g., speed of the vehicle), and $d\omega_i/dt$ is acceleration of the ith wheel. The brake regulation torque for each wheel is the sum of regenerative braking torque for the wheel and the friction braking torque for the wheel. The regenerative braking torque for the wheel may be determined from electric machine torque and gear ratios between the electric machine and the respective wheels. Wheel speed may be determined via wheel speed sensors, road angle may be determined via an inclinometer, and wheel inertia may be determined empirically. The braking regulation torque for the secondary axle right wheel may be abbreviated as Tq_brakeRequ_SDAxle_L. The braking regulation torque for the secondary axle right wheel may be abbreviated as Tq_brakeRequ_SDAxle_R. Method 400 proceeds to 416.

At 416, method 400 determines the regenerative braking torque of the secondary axle. Here, two all-wheel drive (AWD) configurations are discussed: mechanical AWD with the use of a transfer case, and AWD via independent electric motors for each axle (e.g., primary axle is driven by an engine and electric motor 1, and secondary axle is driven by electric motor 2). In these two configurations, the determination of the regenerative braking torque of the secondary axle may be different as described herein.

In one example, method 400 determines the potential regenerative braking torque for the vehicle including the primary and secondary axles for an AWD vehicle with a transfer case as described herein. In the first configuration, the potential regenerative braking torque is a larger value of the electric machine torque limit (Tq_mtrLim) and the battery torque charge limit (Tq_battChrgLim). The potential vehicle regenerative braking torque may be determined via the following equation:

$$Tq\_regen\_Pot = max(Tq\_mtrLim, Tq\_battChrgLim)$$

where Tq_regen_Pot is the potential regenerative braking torque for the vehicle, Tq_mtrLim is an electric machine torque limit that may include the RDU electric machine and the ISG/BISG and Tq_battChrgLim is a battery charging torque limit (e.g., a regenerative braking torque at which the battery cannot accept a higher rate of charging).

Method 400 also judges if the absolute value of the potential regenerative braking torque for the vehicle (Tq_regen_Pot) is greater than the absolute value of the regenerative braking torque for the primary axle (Tq_regen_PDAxle) and if the front axle is coupled to the transmission and rear axle via the transfer case. If not, regenerative braking torque for the secondary axle is zero. If so, regenerative braking torque for the secondary axle is determined via the following equation:

$$Tq\_regen\_SDAxle = max(lowPassFilter(Tq\_brakeRequ\_SDAxle\_L)*rt\_3, lowPassFilter1(Tq\_brakeRequ\_SDAxle\_R)*rt\_4, Tq\_regen\_Pot-Tq\_regen\_PDAxle, Tq\_vehStabLim\_SDAxle, Tq\_AWDtransfCap)$$

where Tq_regen_SDAxle is the regenerative braking torque for the secondary axle, max is a function that return a greater value of the arguments input to the function max, lowPassFilter1(arg1) is a function that provides a low pass filtered value (e.g., $y(i) = \alpha_1 \cdot x(i) + (1-\alpha_1) \cdot y(i-1)$, where y is the filter output, i is the sample number, x is the filter input, and α is a filtering factor that is the same for the primary and secondary axles) of input arg1, rt 3 is an empirically determined percentage (e.g., 0.1 or 10%, that may vary from 0 to 100%), rt 4 is an empirically determined percentage (e.g., 0.1 or 10%, that may vary from 0 to 100%), Tq_brakeRequ_SDAxle_L is brake regulation torque for the left wheel of the secondary axle, Tq_brakeRequ_SDAxle_R is brake regulation torque for the right wheel of the secondary axle, Tq_regen_Pot is the potential regenerative braking torque for the vehicle, Tq_regen_PDAxle is the regenerative braking torque for the primary axle, Tq_vehStabLim_SDAxle is a secondary axle torque limit for maintaining vehicle stability, Tq_AWDtransfCap is the torque transfer capacity of the transfer case.

Thus, Tq_regen_SDAxle is a fraction of a low pass filtered value of Tq_brakeRequ_SDAxle_L or Tq_brakeRequ_SDAxle_R when the magnitude of each variable Tq_regen_Pot-Tq_regen_PDAxle, Tq_vehStabLim_SDAxle, and Tq_AWDtransfCap is greater than the magnitude of Tq_brakeRequ_SDAxle_L or Tq_brakeRequ_SDAxle_R. By determining Tq_regen_SDAxle as a fraction of low pass filtered variable Tq_brakeRequ_SDAxle_L or variable Tq_brakeRequ_SDAxle_R, high frequencies may be eliminated from the secondary axle regeneration torque so that driveline noise and vibration may be reduced. Further, the empirically determined multipliers rt_3 and rt_4 may reduce the regenerative braking torque so as to ensure that a portion of braking torque is provided via the highly dynamic friction braking system so that braking effectiveness is maintained.

In the second AWD configuration with independent motors for the primary and secondary axle, the potential regenerative braking torque of the secondary axle (Tq_regen_Pot_SDAxle) is a larger value of the electric machine torque limit (Tq_mtrLim_SDAxle) of the secondary axle, and the battery torque charge limit (Tq_battChrgLim) subtracted by the regenerative braking torque of the primary axle (Tq_regen_PDAxle). The potential regenerative braking torque of the secondary axle may be determined via the following equation:

$$Tq\_regen\_Pot\_SDAxle = max(Tq\_mtrLim\_SDAxle, Tq\_battChrgLim-Tq\_regen\_PDAxle)$$

The regenerative braking torque for the secondary axle is determined via the following equation:

$$Tq\_regen\_SDAxle = max(lowPassFilter2(Tq\_brakeRequ\_SDAxle\_L)*rt\_3, lowPassFilter2(Tq\_brakeRequ\_SDAxle\_R)*rt\_4, Tq\_vehStabLim\_SDAxle, Tq\_regen\_Pot\_SDAxle)$$

where Tq_regen_SDAxle is the regenerative braking torque for the secondary axle, max is a function that return a greater value of the arguments input to the function max, lowPassFilter2(arg1) is a function that provides a low pass filtered value (e.g., $y(i) = \alpha_2 \cdot x(i) + (1-\alpha_2) \cdot y(i-1)$, where y is the filter output, i is the sample number, x is the filter input, and $\alpha_2$ is a filtering factor that is unique for the secondary axle) of input arg1, rt_3 is an empirically determined percentage (e.g., 0.1 or 10%, that may vary from 0 to 100%), rt_4 is an empirically determined percentage (e.g., 0.1 or 10%, that may vary from 0 to 100%), Tq_brakeRequ_SDAxle_L is brake regulation torque for the left wheel of the secondary axle, Tq_brakeRequ_SDAxle_R is brake regulation torque for the right wheel of the secondary axle, Tq_regen_PDAxle is the regenerative braking torque for the primary axle, Tq_vehStabLim_SDAxle is a secondary axle torque limit for maintaining vehicle stability, Tq_regen_Pot_SDAxle is the potential regenerative braking torque for the secondary axle. The low pass filter filtering factor $\alpha_2$ may be a different value that the low pass filtering factor $\alpha_1$ so that regenerative braking provided by the electric machine or machines associated with the primary and secondary axles may be unique for different desired regenerative braking response. For example, faster regenerative braking response from the secondary axle than from the primary axle may be desired. This leads to a higher filtering cut-off frequency, hence, a bigger value of $\alpha_2$. Note that the cut-off frequency can be chosen up to the natural frequency of the mechanical system (e.g. the drive axle); and the natural frequency is dictated by its physical system characteristic, e.g. inertia of the motor and compliance of the drivetrain. If fastest regenerative braking response of both axles is warranted, the filtering factors may be different. For example, assuming the same drivetrain compliance between primary and secondary axles, the filtering factor $\alpha_2$ of the secondary axle will be bigger because of smaller motor (or lower inertia). Method 400 proceeds to 418.

At 418, method 400 determines friction braking torque for the primary axle. In one example, method 400 may determine the friction braking torque for the primary axle via the following equations:

$$Tq\_fric\_SDAxle\_L = Tq\_brakeRegu\_SDAxle\_L - Tq\_regen\_SDAxle*0.5$$

$$Tq\_fric\_SDAxle\_R = Tq\_brakeRegu\_SDAxle\_R - Tq\_regen\_SDAxle*0.5$$

where Tq_fric_SDAxle_L is the friction torque for the left wheel of the secondary axle, Tq_fric_SDAxle_R is the friction torque for the right wheel of the secondary axle, Tq_brakeRegu_SDAxle_L is the regenerative braking torque of the left wheel of the secondary axle, Tq_brakeRegu_SDAxle_R is the regenerative braking torque of the right wheel of the secondary axle, and Tq_regen_SDAxle is the regenerative braking torque for the secondary axle.

Thus, the friction torque of the secondary axle left wheel is the braking regulation torque of the secondary axle left wheel minus one half the regenerative braking torque of the secondary axle left wheel. Similarly, the friction torque of the secondary axle right wheel is the braking regulation torque of the secondary axle right wheel minus one half the regenerative braking torque of the secondary axle right wheel. Method 400 proceeds to exit.

Thus, the method of FIG. 4 provides for a vehicle operating method, comprising: adjusting a regeneration torque of a primary axle to a lower magnitude value of a low pass filtered primary axle regulation torque of a right wheel and a low pass filtered primary axle regulation torque of a left wheel in response to activation of an anti-lock braking system. The method further comprises applying friction brakes in response to activating the anti-lock braking system. The method includes where the anti-lock braking system is activated via activating a brake line pressure regulation valve. The method includes where the regenerative braking torque of the primary axle is provided via an electric machine of a rear drive unit. The method further comprises adjusting the regenerative torque of the primary axle responsive to requested braking torque provided via a human driver when the anti-lock braking system is not activated. The method includes where the primary axle is provided torque via an engine and an electric machine. The method further comprises adjusting friction brakes of the primary axle to a torque determined from subtracting the regeneration torque of the primary axle from a brake regulation torque of the primary axle.

The method of FIG. 4 also provides for a vehicle operating method, comprising: adjusting a regeneration torque of a primary axle to a lower magnitude value of a low pass filtered primary axle regulation torque of a right wheel and a low pass filtered primary axle regulation torque of a left wheel; and adjusting a regeneration torque of a secondary axle to a lower magnitude value of a low pass filtered secondary axle regulation torque of a right wheel and a low pass filtered secondary axle regulation torque of a right wheel. The method includes where the regeneration torque of the secondary axle is adjusted in further response to a potential regeneration braking torque. The method further comprises adjusting friction brakes of the secondary axle to a torque determined from subtracting the regeneration torque of the secondary axle from a brake regulation torque of the secondary axle, and where a cut-off frequency of the low pass filtered primary axle regulation torque is equal to a cut-off frequency of the low pass filtered secondary axle regulation torque. The method includes where a cut-off frequency of the low pass filtered primary axle regulation torque is different from a cut-off frequency of the low pass filtered secondary axle regulation torque. The method includes where adjusting the regeneration torque of the primary axle and the regulation torque of the secondary axle is performed in response to activation of an anti-lock braking system. The method includes where the anti-lock braking system is activated via activating a brake line pressure regulation valve. The method further comprises adjusting a regeneration torque of the primary axle responsive to requested braking torque provided via a human driver when an anti-lock braking system is not activated.

Referring now to FIG. 5, a prophetic operating sequence according to the method of FIG. 4 is shown. The vehicle operating sequence shown in FIG. 5 may be provided via the method of FIG. 4 in cooperation with the system shown in FIGS. 1A-3. The plots shown in FIG. 5 occur at the same time and are aligned in time.

The first plot from the top of FIG. 5 is a plot of vehicle speed versus time. The vertical axis represents vehicle speed and vehicle speed increases in the direction of the vertical axis arrow. The horizontal axis represents time and time increases from the left side of the figure to the right side of the figure.

The second plot from the top of FIG. 5 is a plot of anti-lock braking system state. The anti-lock friction brakes are active and regulating brake torque when the trace is at a higher level near the vertical axis arrow. The anti-lock friction brakes are not active and regulating brake torque when the trace is at a lower level near the horizontal axis. The horizontal axis represents time and time increases from the left side of the figure to the right side of the figure.

The third plot from the top of FIG. 5 is a plot of a brake torque request for the vehicle. The brake torque request may be provided by a human driver or an autonomous driver and it represents braking torque applied to all four vehicle wheels. The braking torque is a negative torque and its magnitude increases in the direction of the vertical axis arrow. The horizontal axis represents time and time increases from the left side of the figure to the right side of the figure.

The fourth plot from the top of FIG. 5 is a plot of vehicle braking torque delivered. For this example, the vehicle braking torque delivered for regulation is for the wheels of the primary axle. The vehicle braking torque delivered for regulation is the braking torque applied to the vehicle wheels. The horizontal axis represents time and time increases from the left side of the figure to the right side of the figure.

The fifth plot from the top of FIG. 5 is a plot of friction braking torque. The friction braking torque shown is a sum of friction braking torque wheels of the primary axle. The horizontal axis represents time and time increases from the left side of the figure to the right side of the figure.

The sixth plot from the top of FIG. 5 is a plot of electric machine or regenerative braking torque. The electric machine braking torque shown is a sum of friction braking torque at all four wheels via the RDU electric machine and/or the ISG and/or BISG. Alternatively, if the vehicle includes regenerative braking only for the primary axle, the regenerative braking torque is the regenerative braking torque applied to wheels of the primary axle. The horizontal axis represents time and time increases from the left side of the figure to the right side of the figure. The horizontal axis for the third, fourth, fifth, and sixth plots from the top of FIG. 5 represent zero braking torque.

At time T0, the vehicle speed is low and the vehicle brakes are not applied as indicated by the brake torque request being zero. Further, the electric machine torque is zero and anti-lock brakes are not activated. Between time T0 and time T1, the vehicle accelerates while vehicle brakes are not actuated.

At time T1, the driver (not shown) applies the brake pedal (not shown) and the requested braking torque increases responsive to brake pedal position (not shown). The friction brakes are not applied, but the electric machine begins to provide braking torque. The brake torque delivered for regulation follows the brake torque request. Between time T0 and time T1, the magnitude of the brake torque request increases and the magnitude of the brake torque delivered for regulation increases to follow the brake torque request. The vehicle slows, but the anti-lock braking system is not activated. The friction brakes are not applied.

At time T2, the anti-lock braking system is activated in response to wheel speed as indicated by the ABS state transitioning to a higher level. The friction brakes are activated and friction braking torque magnitude increases. Electric machine torque or regenerative braking torque magnitude decreases in response to activating the anti-lock braking system. By reducing electric machine torque and activating the friction brakes, wheel rotation may continue or resume so that braking efficiency may be maintained or improved. The braking torque request remains at its previous value since driver input has not changed.

Between time T2 and time T3, the electric machine torque or regenerative braking torque is adjusted to a low pass filtered value of the braking regulation torque of the right or left primary axle. The friction braking torque of the primary left wheel is the regulation torque for the primary left wheel minus one half of the regeneration torque for the primary axle. The friction braking torque for the primary right wheel is the regulation torque for the primary right wheel minus one half of the regeneration torque for the primary axle.

At time T3, the ABS is deactivated in response to a reduction in the magnitude of the brake torque request or wheel slip ending. The electric machine braking torque or regenerative braking torque magnitude is increased to provide the brake torque request. The brake torque delivered for regulation is equal to the brake torque request and the friction brakes are deactivated.

In this way, wheel braking torque may be allocated to regenerative braking and friction braking. If wheel lock is detected via activation of an ABS braking system, regenerative braking may be reduced while at the same time friction braking is activated.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle operating method, comprising:
adjusting a regeneration torque of a primary axle to a lower magnitude value of a low pass filtered primary axle regulation torque of a right wheel and a low pass filtered primary axle regulation torque of a left wheel in response to activation of an anti-lock braking system.

2. The method of claim 1, further comprising applying friction brakes in response to activating the anti-lock braking system.

3. The method of claim 2, where the anti-lock braking system is activated via activating a brake line pressure regulation valve.

4. The method of claim 1, where the regeneration torque of the primary axle is provided via an electric machine of a rear drive unit.

5. The method of claim 1, further comprising adjusting the regeneration torque of the primary axle responsive to requested braking torque provided via a human driver when the anti-lock braking system is not activated.

6. The method of claim 1, where the primary axle is provided torque via an engine and an electric machine.

7. The method of claim 1, further comprising adjusting friction brakes of the primary axle to a torque determined from subtracting the regeneration torque of the primary axle from a brake regulation torque of the primary axle.

8. A vehicle operating method, comprising:
adjusting a regeneration torque of a primary axle to a lower magnitude value of a low pass filtered primary axle regulation torque of a right wheel and a low pass filtered primary axle regulation torque of a left wheel; and
adjusting a regeneration torque of a secondary axle to a lower magnitude value of a low pass filtered secondary axle regulation torque of the right wheel and a low pass filtered secondary axle regulation torque of the left wheel.

9. The method of claim 8, where the regeneration torque of the secondary axle is adjusted in further response to a difference between a potential regeneration braking torque of a vehicle and the regeneration torque of the primary axle.

10. The method of claim 8, further comprising adjusting friction brakes of the secondary axle to a torque determined from subtracting the regeneration torque of the secondary axle from a brake regulation torque of the secondary axle, and where a cut-off frequency of the low pass filtered primary axle regulation torque is equal to a cut-off frequency of the low pass filtered secondary axle regulation torque.

11. The method of claim 8, where a cut-off frequency of the low pass filtered primary axle regulation torque is different from a cut-off frequency of the low pass filtered secondary axle regulation torque.

12. The method of claim 8, where adjusting the regeneration torque of the primary axle and the regeneration torque of the secondary axle is performed in response to activation of an anti-lock braking system.

13. The method of claim 12, where the anti-lock braking system is activated via activating a brake line pressure regulation valve.

14. The method of claim 8, further comprising adjusting the regeneration torque of the primary axle responsive to requested braking torque provided via a human driver when an anti-lock braking system is not activated.

15. A vehicle system, comprising:
an anti-lock friction braking system including four friction brakes;
a first electric machine;
a second electric machine; and
a controller including executable instructions stored in non-transitory memory that cause the controller to filter wheel torques of a first axle via a first low pass filter having a first cut-off frequency and to filter wheel torques of a second axle via a second low pass filter having a second cut-off frequency.

16. The vehicle system of claim 15, further comprising additional instructions to adjust a regeneration torque of a primary axle to a lower magnitude value of a low pass filtered primary axle regulation torque of a right wheel and a low pass filtered primary axle regulation torque of a left wheel, and further comprising an engine providing torque to the primary axle.

17. The vehicle system of claim 16, further comprising additional instructions to adjust a regeneration torque of a secondary axle to a lower magnitude value of a low pass filtered secondary axle regulation torque of the right wheel and a low pass filtered secondary axle regulation torque of the left wheel; and further comprising additional instructions to adjust the regeneration torque of the primary axle responsive to requested braking torque provided via a human driver when the anti-lock friction braking system is not activated.

18. The vehicle system of claim 15, further comprising additional instructions to apply at least one of the four friction brakes in response to activating the anti-lock friction braking system, and wherein the anti-lock friction braking system is activated via a brake line pressure regulation valve.

19. The vehicle system of claim 15, where the first cut-off frequency is lower than the second cut-off frequency.

20. The vehicle system of claim 19, where the first cut-off frequency is based on both an inertia of the first electric machine and its drivetrain compliance, where the second cut-off frequency is based on an inertia of the second electric machine and its drivetrain compliance, and where the first and second electric machines provide torque to a vehicle driveline.

* * * * *